United States Patent
Cohen et al.

(10) Patent No.: US 7,346,878 B1
(45) Date of Patent: Mar. 18, 2008

(54) APPARATUS AND METHODS FOR PROVIDING IN-CHIP MICROTARGETS FOR METROLOGY OR INSPECTION

(75) Inventors: Avi Cohen, Kiryat Tiron (IL); Mark Ghinovker, Migdal Ha'Emek (IL); Michael E. Adel, Zichron Ya'akov (IL)

(73) Assignee: KLA-Tencor Technologies Corporation, Milipitas, CA (US)

( * ) Notice: Subject to any disclaimer, the term of this patent is extended or adjusted under 35 U.S.C. 154(b) by 520 days.

(21) Appl. No.: 10/858,836

(22) Filed: Jun. 1, 2004

Related U.S. Application Data

(60) Provisional application No. 60/484,627, filed on Jul. 2, 2003.

(51) Int. Cl.
  *G06F 17/50* (2006.01)
(52) U.S. Cl. .......................................... 716/11; 716/13
(58) Field of Classification Search ................ 716/2, 716/11, 13, 18
  See application file for complete search history.

(56) References Cited

U.S. PATENT DOCUMENTS

| | | | |
|---|---|---|---|
| 4,251,160 A | 2/1981 | Bouwhuis et al. |
| 4,475,811 A | 10/1984 | Brunner |
| 4,538,105 A | 8/1985 | Ausschnitt |
| 4,703,434 A | 10/1987 | Brunner |
| 4,714,874 A | 12/1987 | Morris et al. |
| 4,757,207 A | 7/1988 | Chappelow et al. |
| 4,757,707 A | 7/1988 | Harvey et al. |
| 4,778,275 A | 10/1988 | van den Brink et al. |
| 4,782,288 A | 11/1988 | Vento |
| 4,820,055 A | 4/1989 | Müller |
| 4,855,253 A | 8/1989 | Weber |
| 4,929,083 A | 5/1990 | Brunner |

(Continued)

FOREIGN PATENT DOCUMENTS

EP  0818814  1/1998

(Continued)

OTHER PUBLICATIONS

Ghinovker, et al., "Overlay Marks, Methods of Overlay Mark Design and Methods of Overlay Measurements", U.S. Appl. No. 09/894,987, filed Jun. 27, 2001.

(Continued)

*Primary Examiner*—Thuan Do
(74) *Attorney, Agent, or Firm*—Beyer Weaver LLP

(57) ABSTRACT

Disclosed are techniques and apparatus for providing metrology or inspection targets in-chip. That is, targets are integrated within the product device or die area. In general terms, the present invention provides techniques for enabling inspection or metrology on targets within the die or active area. Said in another way, target structures are inserted within the die or active area. In one embodiment, a set of rules are provided for integrating test structures within the die. For example, these rules may be implemented by one or more design engineers or by place-and-route tools which automatically generate the die layout pattern and thereafter insert the target structures into the die layout pattern based on these rules. Location data of each target is then retained during the layout generation and provided to one or more inspection or metrology tools and/or metrology engineers so that each target may be found and then inspected or measured.

53 Claims, 9 Drawing Sheets

U.S. PATENT DOCUMENTS

| | | | |
|---|---|---|---|
| 5,017,514 A | 5/1991 | Nishimoto | |
| 5,100,237 A | 3/1992 | Wittekoek et al. | |
| 5,112,129 A | 5/1992 | Davidson et al. | |
| 5,148,214 A | 9/1992 | Ohta et al. | |
| 5,156,982 A | 10/1992 | Nagoya | |
| 5,172,190 A | 12/1992 | Kaiser | |
| 5,216,257 A | 6/1993 | Brueck et al. | |
| 5,262,258 A | 11/1993 | Yanagisawa | |
| 5,296,917 A | 3/1994 | Kusonose et al. | |
| 5,383,136 A | 1/1995 | Cresswell et al. | |
| 5,414,514 A | 5/1995 | Smith et al. | |
| 5,436,097 A | 7/1995 | Norishima et al. | |
| 5,438,413 A | 8/1995 | Mazor et al. | |
| 5,477,057 A | 12/1995 | Angeley et al. | |
| 5,479,270 A | 12/1995 | Taylor | |
| 5,481,362 A | 1/1996 | Van Den Brink et al. | |
| 5,498,501 A | 3/1996 | Shimoda et al. | |
| 5,596,413 A | 1/1997 | Stanton et al. | |
| 5,604,819 A | 2/1997 | Barnard | |
| 5,617,340 A | 4/1997 | Cresswell et al. | |
| 5,627,083 A | 5/1997 | Tounai et al. | |
| 5,665,495 A | 9/1997 | Hwang | |
| 5,674,650 A | 10/1997 | Dirksen et al. | |
| 5,699,282 A | 12/1997 | Allen et al. | |
| 5,701,013 A | 12/1997 | Hsia et al. | |
| 5,702,567 A | 12/1997 | Mitsui et al. | |
| 5,703,685 A | 12/1997 | Senda et al. | |
| 5,712,707 A | 1/1998 | Ausschnitt et al. | |
| 5,757,507 A | 5/1998 | Ausschnitt et al. | |
| 5,766,809 A | 6/1998 | Bae | |
| 5,783,342 A | 7/1998 | Yamashita et al. | |
| 5,805,290 A | 9/1998 | Ausschnitt et al. | |
| 5,835,196 A | 11/1998 | Jackson | |
| 5,857,258 A | 1/1999 | Penzes et al. | |
| 5,863,680 A | 1/1999 | Kawakubo et al. | |
| 5,872,042 A | 2/1999 | Hsu et al. | |
| 5,877,036 A | 3/1999 | Kawai | |
| 5,877,861 A | 3/1999 | Ausschnitt et al. | |
| 5,902,703 A | 5/1999 | Leroux et al. | |
| 5,912,983 A | 6/1999 | Hiratsuka | |
| 5,923,041 A | 7/1999 | Cresswell et al. | |
| 5,939,226 A | 8/1999 | Tomimatu | |
| 5,949,145 A | 9/1999 | Komuro | |
| 5,960,125 A | 9/1999 | Michael et al. | |
| 5,968,693 A | 10/1999 | Adams | |
| 6,020,966 A | 2/2000 | Ausschnitt et al. | |
| 6,023,338 A | 2/2000 | Bareket | |
| 6,037,671 A | 3/2000 | Kepler et al. | |
| 6,061,606 A | 5/2000 | Ross | 700/121 |
| 6,077,756 A | 6/2000 | Lin et al. | |
| 6,079,256 A | 6/2000 | Bareket | |
| 6,084,679 A | 7/2000 | Steffan et al. | |
| 6,118,185 A | 9/2000 | Chen et al. | |
| 6,128,089 A | 10/2000 | Ausschnitt et al. | |
| 6,130,750 A | 10/2000 | Ausschnitt et al. | |
| 6,137,578 A | 10/2000 | Ausschnitt | |
| 6,140,217 A | 10/2000 | Jones et al. | |
| 6,146,910 A | 11/2000 | Cresswell et al. | |
| 6,160,622 A | 12/2000 | Dirksen et al. | |
| 6,165,656 A | 12/2000 | Tomimatu | |
| 6,384,899 B1 | 5/2002 | den Boef | |
| 6,405,096 B1 | 6/2002 | Toprac et al. | |
| 6,462,818 B1 | 10/2002 | Bareket | |
| 6,612,159 B1 | 9/2003 | Knutrud | |
| 6,664,121 B2 | 12/2003 | Grodnesky et al. | |
| 6,675,053 B2 | 1/2004 | Baluswamy et al. | |
| 6,734,549 B2 * | 5/2004 | Takeoka et al. | 257/700 |
| 6,734,971 B2 | 5/2004 | Smith et al. | |
| 6,753,120 B2 | 6/2004 | Kim | |
| 6,921,916 B2 | 7/2005 | Adel et al. | |
| 6,985,618 B2 | 1/2006 | Adel et al. | |
| 7,068,833 B1 | 6/2006 | Ghinovker et al. | |
| 2001/0055720 A1 | 12/2001 | Sato et al. | |
| 2003/0021465 A1 | 1/2003 | Adel et al. | |
| 2003/0021466 A1 | 1/2003 | Adel et al. | |
| 2003/0021467 A1 | 1/2003 | Adel et al. | |
| 2003/0026471 A1 | 2/2003 | Adel et al. | 382/144 |
| 2003/0102440 A1 | 6/2003 | Sohn | |
| 2005/0173634 A1 | 8/2005 | Wong et al. | |
| 2006/0039595 A1 | 2/2006 | Adel et al. | |
| 2006/0177120 A1 | 8/2006 | Ghinovker et al. | |
| 2006/0204073 A1 | 9/2006 | Ghinovker et al. | |

FOREIGN PATENT DOCUMENTS

| | | |
|---|---|---|
| EP | 0947828 | 10/1999 |
| JP | 11067631 | 3/1999 |

OTHER PUBLICATIONS

Adel, et al., "Overlay Metrology and Control Method", U.S. Appl. No. 10/367,124, filed Feb. 13, 2003.

Claims from U.S. Appl. No. 10/950,172, filed Sep. 23, 2004.

U.S. Office Action dated Oct. 10, 2006, U.S. Appl. No. 10/950,172.

Bishop, et al, "The OMAG3 Reticle Set," Jul. 31, 2003, International SEMATECH, Technology Transfer #3074417A-ENG, pp. 1-26.

Dirksen, et al., "Novel aberration monitor for optical lithography", Part of the SPIE Conference on Optical Microlithography XII, Santa Clara, CA Mar. 1999, SPIE vol. 3676, p. 77-86.

Farrar et al., "In-situ measurement of lens aberrations", Mar. 2000 Proceedings of SPIE vo. 4000, Optical Microlithography XIII.

Levinson et al., "Minimization of Total Overlay Errors on Product Wafers Using an Advanced Optimization Scheme", SPIE vol. 3051 (1997) p. 362-373.

Normura, "Measurement of Wave-Front Aberrations in Lithography Lenses with an Overlay Inspection Tool", Optical Review No. 8, vol. 4 (2001) p. 227-234.

Levinson, "Lithography Process Control", Tutorial Texts in Optical Engineering, vol. TT28, Chapter 5, pp. 96-107.

Rivera et al., "Overlay Performance on Tungsten CMP Layers Using the ATHENA Alignment System".

Hsu et al., "Characterizing lens distortion to overlay accuracy by using fine measurement pattern", Mar. 1999, SPIE vol. 3677.

U.S. Appl. No. 10/367,124, filed Feb. 13, 2003; Office Action mailed Apr. 23, 2007 [KLA1P081].

U.S. Appl. No. 10/367,124, filed Feb. 13, 2003; Office Action mailed Oct. 4, 2007 [KLA1P081].

International Search Report from related PCT application No. PCT/US03/04471, dated May 22, 2003 (5 pgs). [KLA1P081.WO].

* cited by examiner

APPARATUS AND METHODS FOR PROVIDING IN-CHIP MICROTARGETS FOR METROLOGY OR INSPECTION

CROSS REFERENCE TO RELATED PATENT APPLICATION

This application claims priority of U.S. Provisional Patent Application No. 60/484,627 filed 2 Jul. 2003 by Avi Cohen et al., which application is incorporated herein by reference in its entirety for all purposes.

BACKGROUND OF THE INVENTION

The present invention relates generally to the field of semiconductor metrology and inspection. More specifically, it relates to techniques for providing targets for metrology and/or inspection.

Generally, the industry of semiconductor manufacturing involves highly complex techniques for fabricating integrating circuits using semiconductor materials which are layered and patterned onto a substrate, such as silicon. Due to the large scale of circuit integration and the decreasing size of semiconductor devices, the device must be defect free prior to shipment of the device to the end users or customers.

Typically, defects are detected within special test structures or targets, rather than the active device or die itself. By way of example, various targets are designed to measure misalignment or overlay errors between two adjacent layers. Other targets are designed for other purposes, such as measurement of critical dimension or detection of electrical faults or killer defects. There are numerous types of targets on which characteristics may be measured or which may be inspected for defects, e.g., by comparing to an ideal reference target to the target under inspection.

Although these targets are used to estimate yield or defect density within the active area, the targets are typically relegated to special test areas of the die (e.g., a test pad in the center of the die) or to the scribe line which is located between the dies. That is, the targets are not located within the same area as the functioning or active device. Conventional positioning of targets outside the active areas allows one to dedicate product space to product features. It has been undesirable to utilize active area space for nonfunctioning structures because engineers are constantly striving to maximize active feature density.

Unfortunately, a test structure positioned in the scribe line does not best represent product function or typically variations across the field of the lithography (or exposure) tool. Multiple dies are exposed in a single field of the lithography tool. Although the scribe lines may extend across the wafer, these scribe lines may not extend across the field. Accordingly, defects captured or measured within the targets may not be a good indicator of defects within the product area or die itself. In a specific case, the lithography tool usually contains aberrations in its lens system which result in feature misalignments or pattern placement errors across the field. Even if a test structure is placed in each field (such as in the center of each die or within a scribe line that extends across the field), a manufacturing process may be different for different areas of the product area, as opposed to the test area. For instance, the process may vary with feature density. By way of specific example, product feature areas may have a different density than target feature areas and, accordingly, polish differently than the target feature areas. Thus, deviations or defects which depend on feature density are not captured by placing targets in special test areas because the targets may not have a feature density that corresponds to a representative sample of the product feature densities.

Accordingly, it would be desirable to have targets which more reliably and accurately represent defects within the active or product region. Additionally, targets which capture deviations across the lithography field are desired.

SUMMARY OF THE INVENTION

Accordingly, metrology or inspection targets are provided in-chip. That is, targets are integrated within the product device or die area. In general terms, the present invention provides techniques for enabling inspection or metrology on targets within the die or active area. Said in another way, target structures are inserted within the die or active area. In one embodiment, a set of rules are provided for integrating test structures within the die. For example, these rules may be implemented by one or more design engineers or by place-and-route tools which automatically generate the die layout pattern and thereafter insert the target structures into the die layout pattern based on these rules. Location data of each target is then retained during the layout generation and provided to one or more inspection or metrology tools and/or metrology engineers so that each target may be found and then inspected or measured.

In a specific embodiment, a method of generating a semiconductor layout pattern that is representative of a semiconductor die and a plurality of target structures is disclosed. A layout pattern that is representative of a semiconductor die and that can be used to fabricate such semiconductor die is provided. A plurality of layout patterns that are representative of a plurality of target structures are integrated into the layout pattern of the die so that the target layout patterns are integrated with the die layout pattern's active regions. The target layout patterns are usable to fabricate the target structures.

In one implementation, the semiconductor die is a product device. In as specific aspect, the die layout pattern includes routing paths between features located within the die layout pattern and the target layout patterns are each integrated into the die layout pattern at locations where there is an absence of the routing paths. In a further aspect, the die layout pattern conforms to a set of layout constraint rules and the target layout patterns are integrated so as to conform to such layout constraint rules, and each target layout pattern has a particular type which must conform to a set of target rules to facilitate inspection or measurement of each fabricated target structure and the target layout patterns are integrated so as to conform to such target rules.

In a specific implementation, the target rules for each target type include a maximum spacing between each target layout pattern and a minimum spacing between each target layout pattern. Each target layout pattern is integrated so that it is at least the minimum spacing for its type to a next one of the target layout patterns having the same type and so that it is no more than the maximum spacing for its type from a next one of the target layout patterns having the same target type. In one aspect, the minimum spacing corresponds to a known process variation for fabricating the die using a particular process.

In one example, at least one of the target types is an overlay type and the target rules for each target layout pattern having the overlay type require that such overlay type target layout pattern be integrated within a first layer and a second subsequent layer so as to have a same center of symmetry.

In another embodiment, the layout constraint rules include feature size constraints and feature pitch requirements, and the target layout patterns are integrated so as to conform to the feature size constraints and the feature pitch constraints. In another aspect, the layout constraint rules include a spacing size and aspect ratio constraint based on each available space within the die pattern, and each target layout pattern is sized to conform to at least one of the available space's size and aspect ratio constraint for integration of such each target in such available space. In one implementation, the target layout patterns are selected from a library of standard target layout patterns which conform to any combination or portion of the layout constraint rules and the target rules.

In another embodiment, location and identity of each target layout pattern are stored as location data. In one aspect, the location data is transferred to a metrology or inspection tool. In another aspect, the location data is stored within a fabrication database which is accessible by a plurality of processing tools for fabricating the die and target structures from the die and target layout patterns. Preferably, the fabrication database is also accessible by a plurality of metrology tools for measuring the target structures and/or a plurality of inspection tools for inspecting the target structures. In a specific embodiment, the location data is stored in a format which allows a metrology or inspection tool to access the stored location data, such as OpenAccess format.

In one implementation, the target layout patterns are integrated automatically by a design tool configured to comply with the layout constraint rules and the target rules. In another embodiment, the target rules include requirements for placing each target layout pattern on a layer within a layer stack which allows measurement or inspection of each target structure. In another aspect, the target rules include a requirement that the layer of each target layout pattern is on a top layer or is underneath a transparent layer. In yet another aspect, the target rules include a requirement that the layer of each target layout pattern is underneath an opaque layer.

In one embodiment, the target rules include placing the target layout patterns so that they conform to a predetermined sample plan. In a further aspect, the sample plan is based on one or more of the following: a known rate of process variation, a known rate of lithography aberration, a known rate of scanning errors, a known rate of reticle write errors, and a measurement uncertainty requirement.

In one implementation, the target layout patterns are integrated within a dummy layer. In another implementation, the target layout patterns are integrated within a special layer which is excluded from the die layout pattern. In a final embodiment, the target structures are selected from a group comprising an overlay target structure, a critical dimension (CD) target structure, a film thickness target structure, a lithography focus or exposure structure, and a chemical mechanical polishing (CMP) uniformity or formed dishing and erosion structure.

In another aspect, the invention pertains to a computer system operable to generate a semiconductor layout pattern that is representative of a semiconductor die and a plurality of target structures. The computer system includes one or more processors and one or more memory configured to perform one or more of the above method operations. In yet another aspect, the invention pertains to a computer program product for generating a semiconductor layout pattern that is representative of a semiconductor die and a plurality of target structures. The computer program product includes at least one computer readable medium and computer program instructions stored within the at least one computer readable product configured to perform one or more of the above described inventive procedures.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
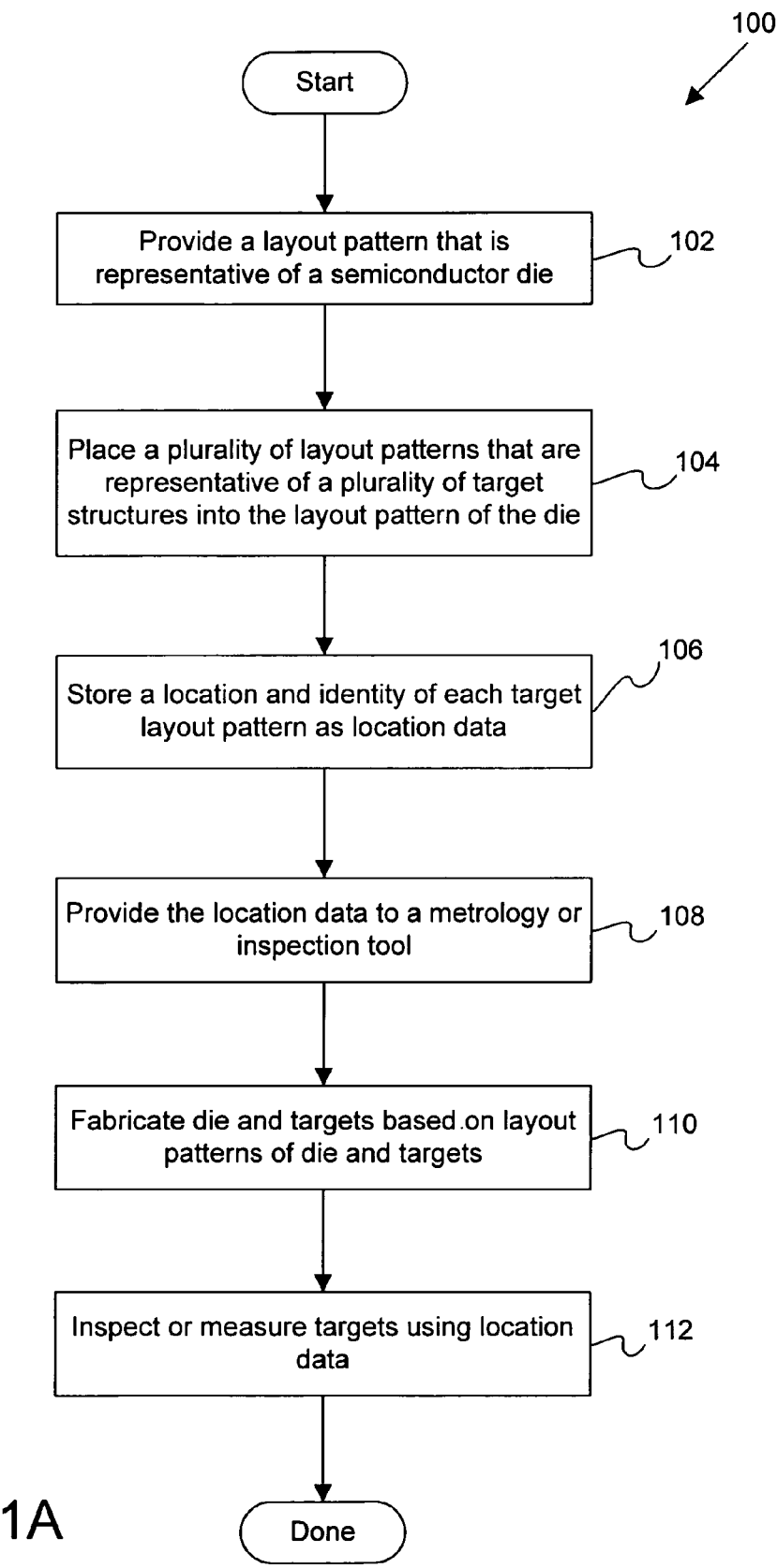
FIG. 1A is a flowchart illustrating a procedure for generating a layout pattern and inspecting targets fabricated from such layout pattern in accordance with one embodiment of the present invention.

FIG. 1A is a flowchart illustrating a procedure 100 for generating a layout pattern and inspecting targets fabricated from such layout pattern in accordance with one embodiment of the present invention. Initially, a layout pattern that is representative of a semiconductor die is provided in operation 102. A plurality of layout patterns that are representative of a plurality of target structures are then placed or integrated into the layout pattern of the die in operation 104. Operations 102 and 104 may be performed together or in a reverse order than the illustrated embodiment. The die and target patterns may be integrated based on a set of rules, which are further described below.

Integrating the targets within the die itself has several advantages. The integrated targets may be more reliably and accurately inspected or measured to determine whether there are any defects or whether a process is deviating out of specification, as compared with conventional targets placed within special test areas or within the scribe line. Since the targets are integrated within the die itself, the targets better represent the active region structures. For instance, the targets have a same feature density as the die features and will likely result in the same defects and process problems as the die features. Accordingly, the targets may be used to more accurately predict product yield (e.g., yield of the active structures).

An integrated circuit (IC) device and target structure may be designed using any suitable design techniques. For example, an IC designer may use preexisting schematic library blocks to form the IC device and targets using, for example, electronic design automation (EDA) tools. In some cases, the IC designer may create an entire IC device target or part of an IC device or target from scratch with the aid of any suitable design system, such as conventional computer aided design (CAD) tools. For example, the IC designer may use a schematic CAD tool to plan the logic diagrams for a particular IC device or target. Still further, the IC designer may write a description of the IC device or target or portions of the IC device or target with the aid of a hardware design language, such as VHDL.

The IC designer then typically generates a layout pattern from the IC circuit design. The layout pattern may be composed of a plurality of electronic representations of IC layers that are later converted into a plurality of reticles that are used to fabricate a plurality of physical layers of an IC device and target. Each physical layer of the fabricated IC device corresponds to one of the reticles and an associated one of the electronic representations from the layout pattern. For example, one electronic representation may correspond to a diffusion pattern on a silicon substrate, another to a gate oxide pattern, another to a gate polysilicon pattern, another to a contact pattern on an interlayer dielectric, another to a line pattern on a metallization layer, and so on. The targets may be formed from any combination of one or more layers. For example, a special layer may be reserved for the target structures, or the targets may be formed from the dummy layer. Each electronic representation is composed of a plurality of polygons or other shapes (herein, referred to as "figures"), which together define the layout or reticle pattern.

The layout pattern may be generated using any suitable technique, for example, by using EDA or CAD tools. For example, the IC designer may manually lay out the layout patterns for the IC device and targets with or without preexisting library cells. Alternatively, a synthesis tool may automatically create layout patterns for the IC device and targets from scratch or by piecing together preexisting library cells based on the schematic design.

A location and identity of each target layout pattern is also stored as location data in operation 106. The location of a particular target may be stored in any suitable format for identifying a position of the particular target. For example, the location may take the form of Cartesian or polar coordinates. The identity is generally used to distinguish between different types of targets. It may take the form of alphanumeric text which identifies the type of target, such as overlay, CD, etc., or the identity may take the form of a reference to a target image.

The location data is provided to a metrology or inspection tool in operation 108. The location data may be provided directly or indirectly through another entity, such as a database or controller. That is, the location data may be output by the CAD module and input or uploaded into a particular inspection or metrology tool. Alternatively, the location data may be stored within the fabrication database which is accessible by the various process, inspection, review, and metrology tools. The location data may be stored in a format that is readable or accessible by a particular inspection, review, or metrology tool. For example, the location data may be in OpenAccess format, which is readable by inspection and metrology tools from KLA-Tencor.

The die and targets are then fabricated based on the layout patterns of the die and targets in operation 110. Reticles are first produced using the layout patterns. Each reticle corresponds to one or more electronic representation(s) from the circuit pattern database. The reticles may be produced by any suitable pattern generator or reticle writer equipment, such as a MEBES" 4500, commercially available from ETEC of Hayward, Calif.

After the die and targets are at least partially fabricated, the targets and/or reticles may then be inspected or measured using the location data in operation 112. Any suitable inspection, review, or metrology tool may be utilized during any stage of the fabrication. Each tool may take the form of an optical system, such as a bright field or dark field optical system. The tool may also utilize both bright field and dark field modes. Examples of bright field systems include the 2350, 2351, 2360, and 2370 from KLA-Tencor, Corp. of San Jose, Calif. Examples of dark field system include the AIT II, AIT XP, Fusion, Fusion UV, and SPI PatternPro available from KLA-Tencor, Corp. of San Jose, Calif. The KLA 301 or 351 Reticle Inspection Tool may be used to inspect reticles. Each tool may also take the form of an electron beam (ebeam) system, such as a scanning, snapshot, or step-and-repeat type ebeam system. Examples of ebeam systems include the eV300 and eS20XP available from KLA Tencor, Corp. of San Jose, Calif. A tool may be designed to detect special types of defects, such as macro defects across a large area of the sample, defects on a bare substrate, or defects within solder burns (e.g., ball grid array bumps). Each tool may also be stand alone or integrated within a processing tool.

Figure 1B:
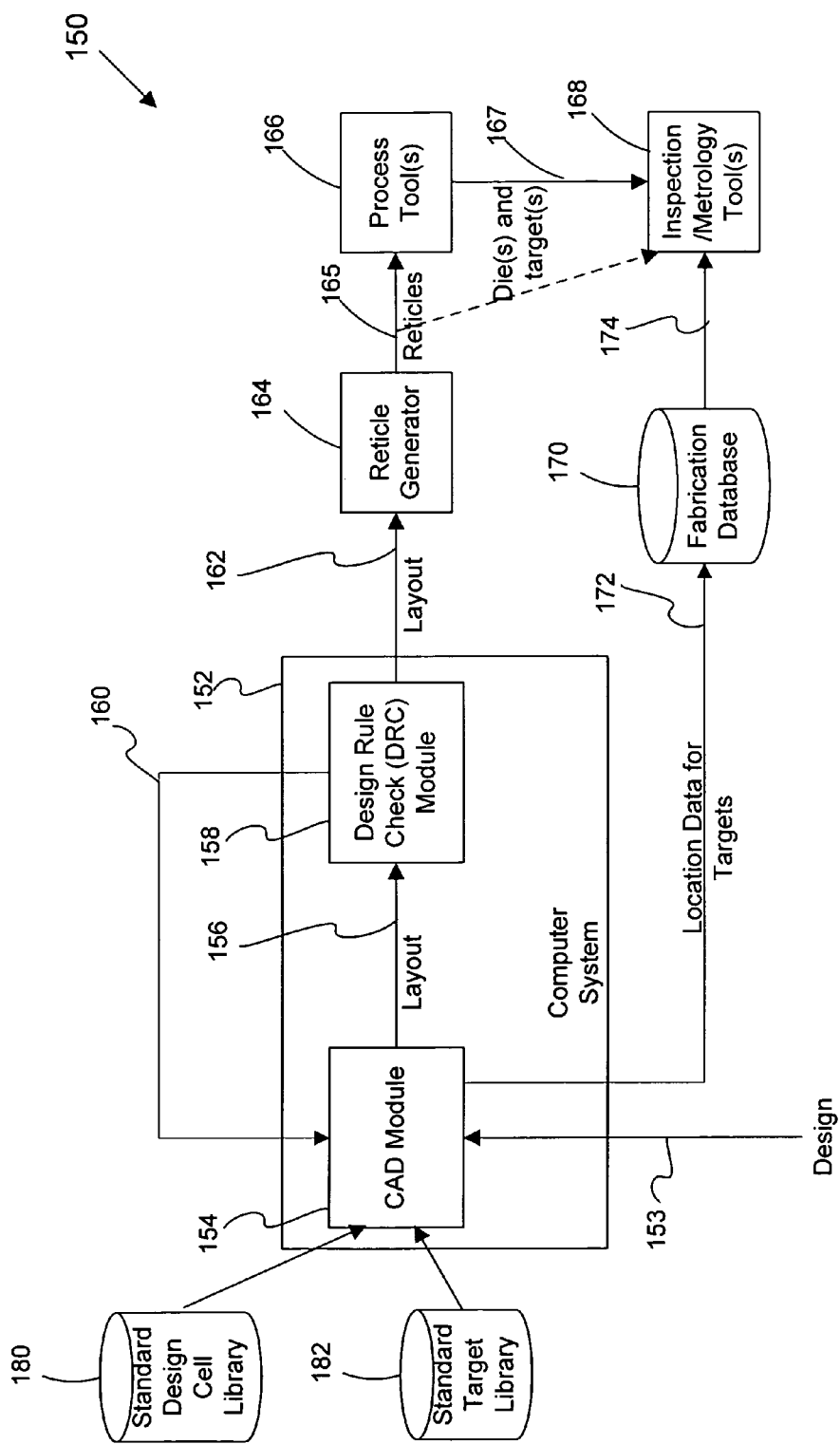
FIG. 1B is a diagrammatic representation of a design, fabrication, and metrology or inspection system in accordance with one embodiment of the present invention.

FIG. 1B is a diagrammatic representation of a design, fabrication, and metrology or inspection system 150 in accordance with one embodiment of the present invention. As shown, a design 153 of a die and targets is input into a computer aided design (CAD) module 154. This CAD module 154 may also have access to one or more databases containing standard layout patterns. In the illustrated embodiment, a standard design cell library 180 includes layout patterns for features within the active regions of the die and a standard target library 182 includes a number of different standard target layout patterns.

The CAD module 154 is generally configured to generate a layout pattern either automatically or via input from a design engineer. Several suitable CAD products for designing IC products are available from Cadence of San Jose, Calif. and Mentor Graphics of Wilsonville, Oreg. The layout pattern 156 is then checked by a design rule check (DRC) module 158. The DRC module is generally configured to determine whether the layout 156 conforms to a set of layout constraints. A feedback pathway 160 is provided to CAD module 154 for modification of the layout pattern 156 when the layout pattern fails to conform to the DRC. For example, the DRC module may indicate a number of nonconforming layout regions which may the be modified to comply with the design rules. As shown, the CAD module and DRC module are contained within the same computer system 152. Of course, the CAD module and DRC module may be implemented in any suitable combination of hardware and software.

Figure 2:
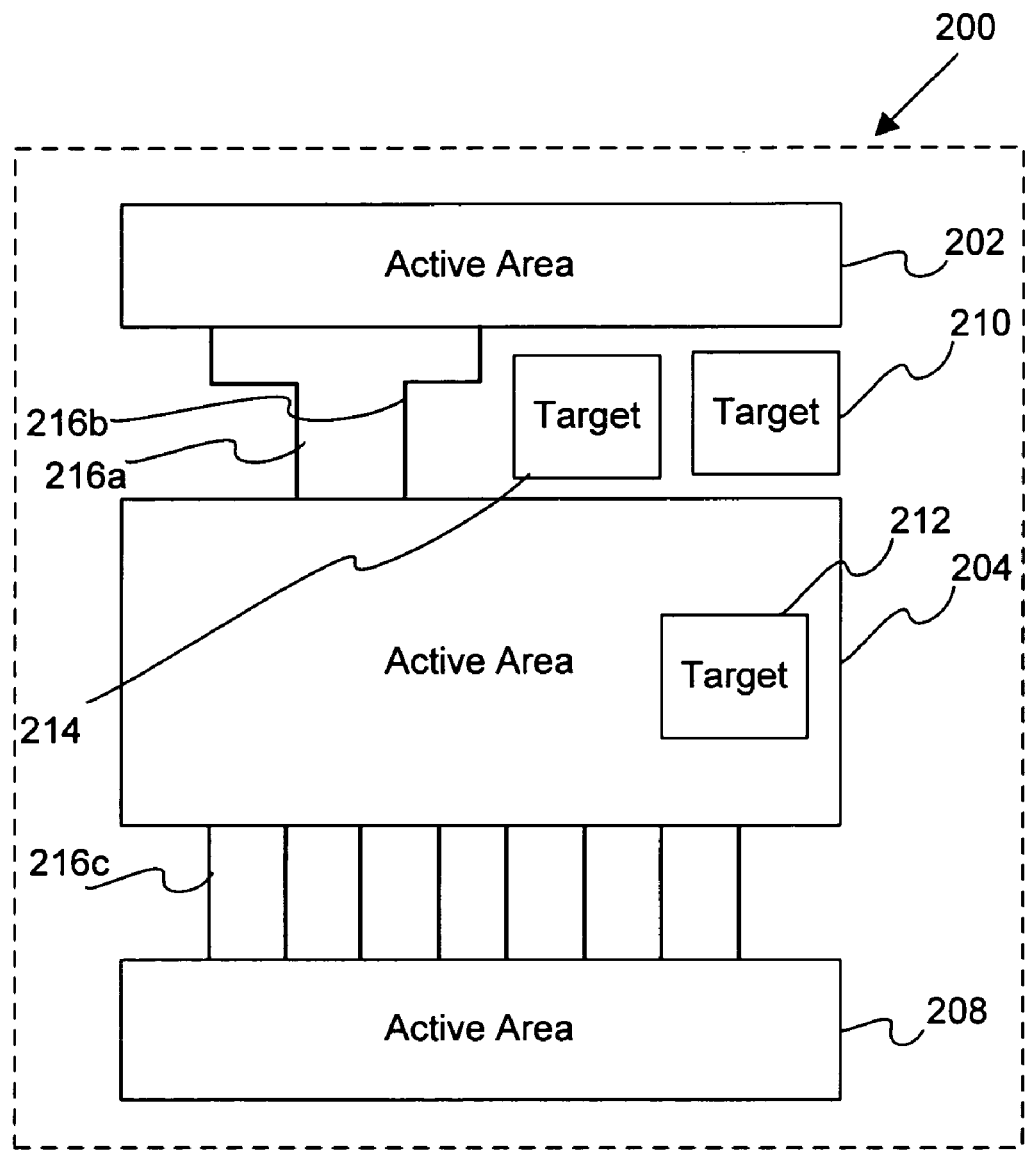
FIG. 2 is a diagrammatic representation of a die layout pattern in accordance with one embodiment of the present invention.

FIG. 2 is a diagrammatic representation of a die layout pattern 200 in accordance with one embodiment of the present invention. The die layout pattern 200 includes active regions of the die, as well as target layout patterns. In other words, target layout patterns have been integrated within the die layout pattern 200. As shown, targets 214, 210, and 212 are integrated with active regions 202, 204, and 208 within the die layout pattern 200.

Referring back to FIG. 1B, after the layout pattern is determined to conform to the design rules by the DRC module 158, the layout pattern 162 is passed to a reticle generator 164 in a form that is readable by the radical generator. For example, the layout may be in a GDSII format. The reticle generator then forms a plurality of reticles 165 based on the layout pattern 162. The reticles may then be used by one or more process tools 166 to at least partially fabricate one or more die(s) and integrated targets 167. The integrated die(s) and targets may then be provided to one or more inspections or metrology tools 168 so that the targets may be inspected or measured. Of course, the reticle targets 165 may also be inspected or measured. The inspection and metrology results obtained from the targets are representative of the active regions within the die.

Location data 172 for each target is also provided to the inspection or metrology tools 168 so that the targets may be found by the tool. In one specific embodiment, the location data is retained in fabrication database 170, which is accessible by the inspection or metrology tools 168. Alternatively, the location data may be directly provided or transferred to the inspection or metrology tools 168.

Figure 3:
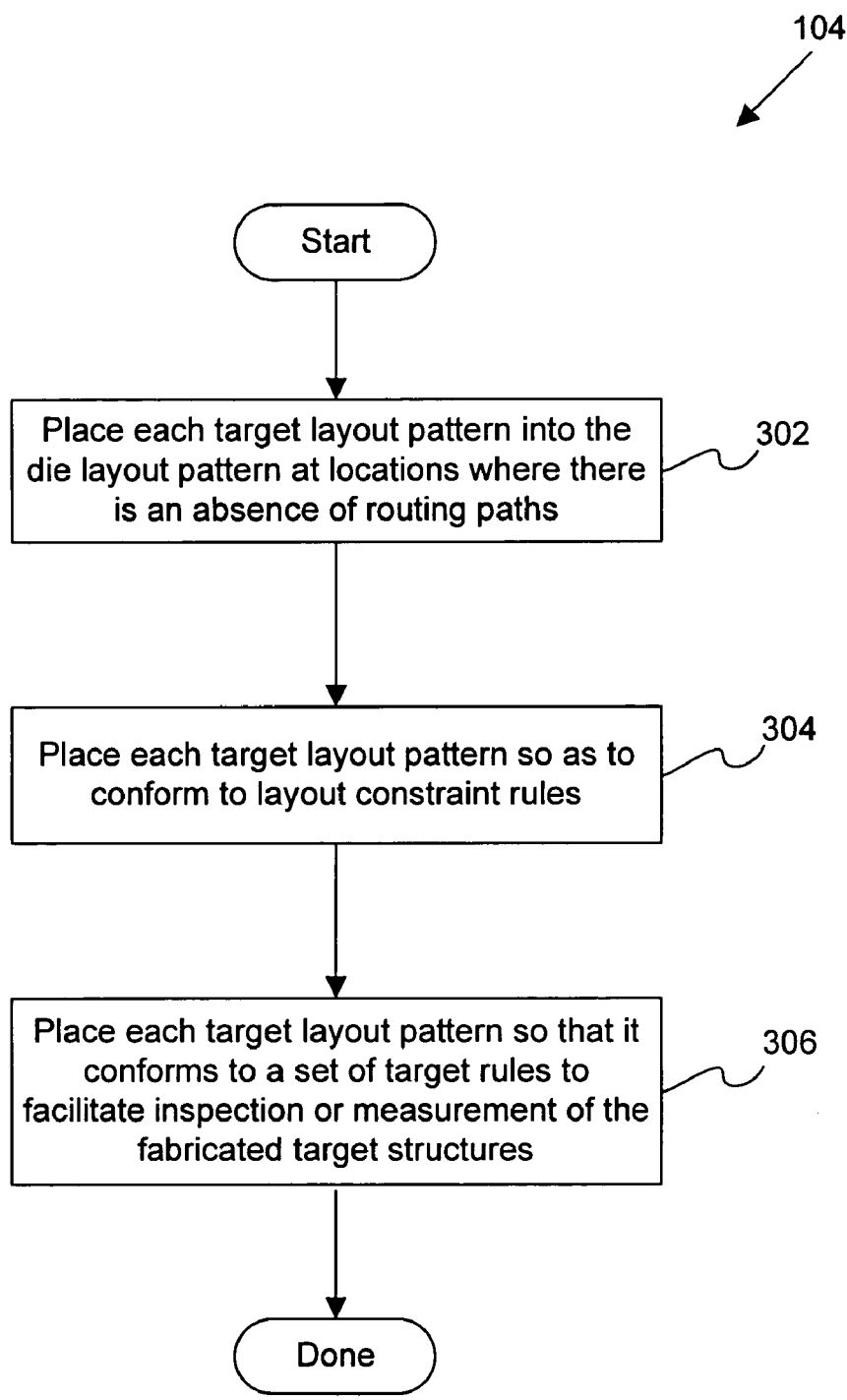
FIG. 3 is a flowchart illustrating the operation of inserting target layout patterns into the die layout pattern in accordance with one embodiment of the present invention.

FIG. 3 is a flowchart illustrating the operation 104 of inserting target layout patterns into the die layout pattern in accordance with one embodiment of the present invention. In general, the integrated die and target layout pattern may be accomplished based on a set of rules outlined in FIG. 3. Although the rules are outlined in a flowchart, one may comply with the rules as a whole, rather than sequentially one at a time, when placing the target layout patterns within the die layout pattern. Additionally, one may place the target layout patterns using any suitable combination of one or more of these rules. The target patterns may be manually or automatically placed, e.g., by CAD module 154 of FIG. 1, so as to conform to one or more rules. Targets may also be selected from a database of standard target layout patterns (e.g., 182 of FIG. 1) which conform to one or more rules.

As shown in FIG. 3, each target layout pattern is placed into the die layout pattern at locations where there is an absence of routing paths in operation 302. In this embodiment, the active regions are placed and routed prior to inserting the target layout patterns. The target layout patterns are inserted into open areas which do not contain routing paths or active region features. The targets may also be placed in empty areas in which dummy structures are typically placed as further described below. Dummy structures are typically placed in relatively large empty spaces. In the layout example of FIG. 2, targets are placed in areas other than routing paths 216 or active regions 202, 204, and 208.

Each target layout pattern is also placed so as to conform to layout constraint rules in operation 304. Layout constraint rules generally include design rules which must be followed to likely achieve a functioning device given the current process parameters. For example, current processes cannot form a structure having a line width below a particular minimum line width. Accordingly, the layout constraints include a minimum limit for line width. Other layout constraint examples are further described below.

Each target layout pattern is also placed so that it conforms to a set of target rules to facilitate inspection or measurement of the fabricated target structures in operation 306. The target may have to be formed with a particular size, shape, and orientation to allow inspection or characterization of the target. For instance, a metrology tool may not be able to measure a particular type of target's features that are smaller than a particular size. Thus, this particular target feature would have to have a size greater than the minimum required size. Further examples of target rules are outlined below.

Figure 4A:
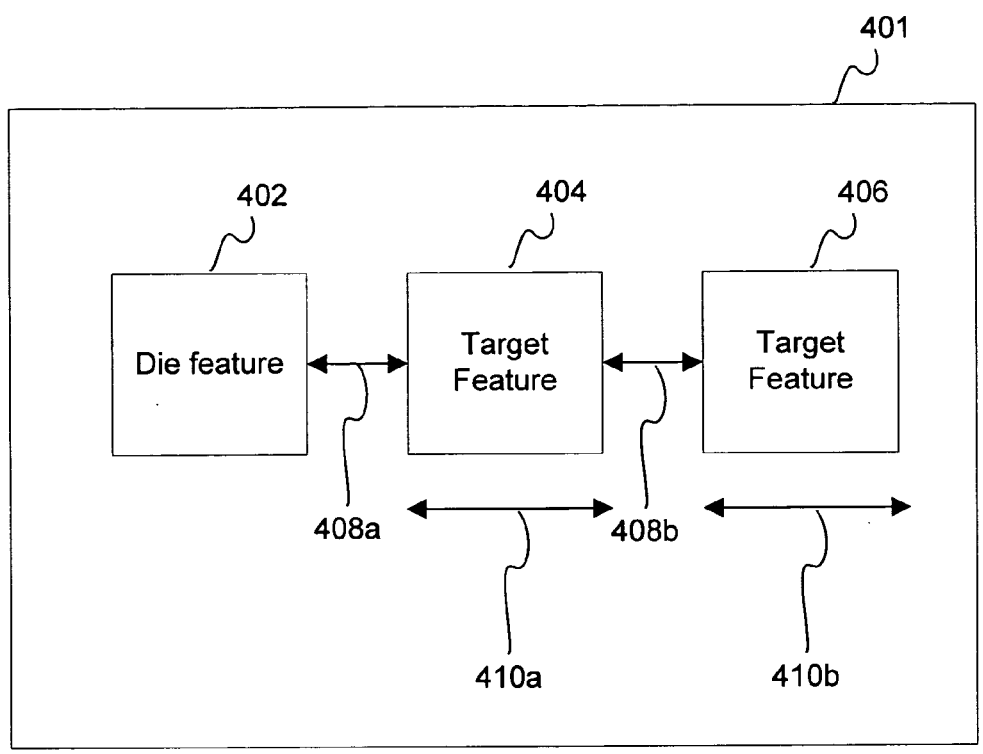
FIG. 4A is a diagrammatic representation of target layout patterns which are placed within a die layout pattern so as to conform to minimum feature size and density layout constraints in accordance with one embodiment of the present invention.

The layout constraint rules may include any number and type of rules for likely achieving a functioning die or reducing defects. One noteworthy layout constraint is a limit on feature size and pitch. The reason for this constraint is that placement errors are typically dependent on feature size and density. FIG. 4A is a diagrammatic representation of target layout patterns which are placed within a die layout pattern 401 so as to conform to minimum feature size and density layout constraints in accordance with one embodiment of the present invention. In this example, the target feature size (as well as the die feature) conforms to the minimum feature size and density constraints. As shown, target feature 404 has a width 410*a* and target feature 406 has width 410*b*. Widths 410*a* and 410*b* are selected to be less than a predetermined minimum width, which depends on the particular process requirements.

In one implementation, the distance between each target and neighboring die or target feature may also be required to be greater than a predetermined minimum distance to comply with a feature density requirement. Thus, distance 408*a* between die feature 402 and target feature 404 is selected to be less than the predetermined minimum distance. Likewise, distance 408*b* between target feature 404 and target feature 406 is selected to be less than the predetermined minimum distance. Accordingly, targets 404 and 406 are placed to meet these distance requirements. Density may also be specified in terms of feature area per total unit area, which is required to be less than a predetermined density value. Thus, the target features 404 and 406 may be sized and placed so that their areas plus the area of die feature 402 divided by the total area 401 is less than the predetermined maximum density value.

Figure 4B:
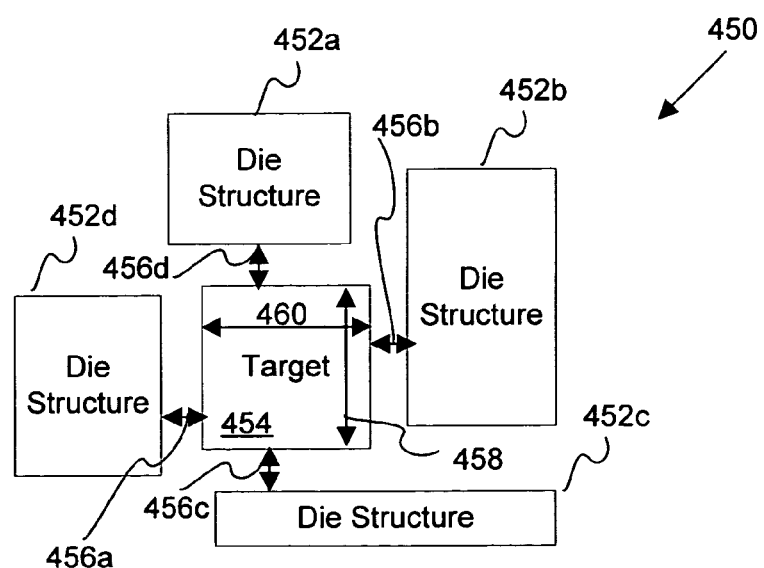
FIG. 4B is a diagrammatic representation of a layout pattern having targets inserted therein which are sized and shaped to conform to layout constraints on available space in accordance with one embodiment of the present invention.

Each target is also sized and placed so as to fit within available spaces of the die layout pattern. FIG. 4B is a diagrammatic representation of a layout pattern 450 having targets inserted therein which are sized and shaped to conform to layout constraints on available space in accordance with one embodiment of the present invention. Said in another way, each target is sized to fit within an available space within the die layout pattern while conforming to design rules. As shown, target 454 has a size and shape to fit in the space formed by die structures 452*a* through 452*d*. As shown, target 454 is also sized, shaped, and placed to obtain a distance 456 from a nearest feature that is greater than or equal to a predetermined minimum distance. Accordingly, target 460 has an aspect ratio of 458 over 460. Standard targets which fit typical available spaces may be retained in a database for quick retrieval during placement of target patterns within a particular die pattern.

The target rules may include any number and type of rules for facilitating inspection, review, or metrology on the target structures. Particular target types are designed to detect defects or problems with one or more process or exposure tools. The targets are preferably placed so as to capture a maximum number of defects or problems without utilizing an unreasonable amount of die area for the targets. The selection of the number and density of the targets is referred to as a "sample plan." In one implementation, the sample plan includes a minimum spacing and a maximum spacing between targets of a same type.

Figure 5:
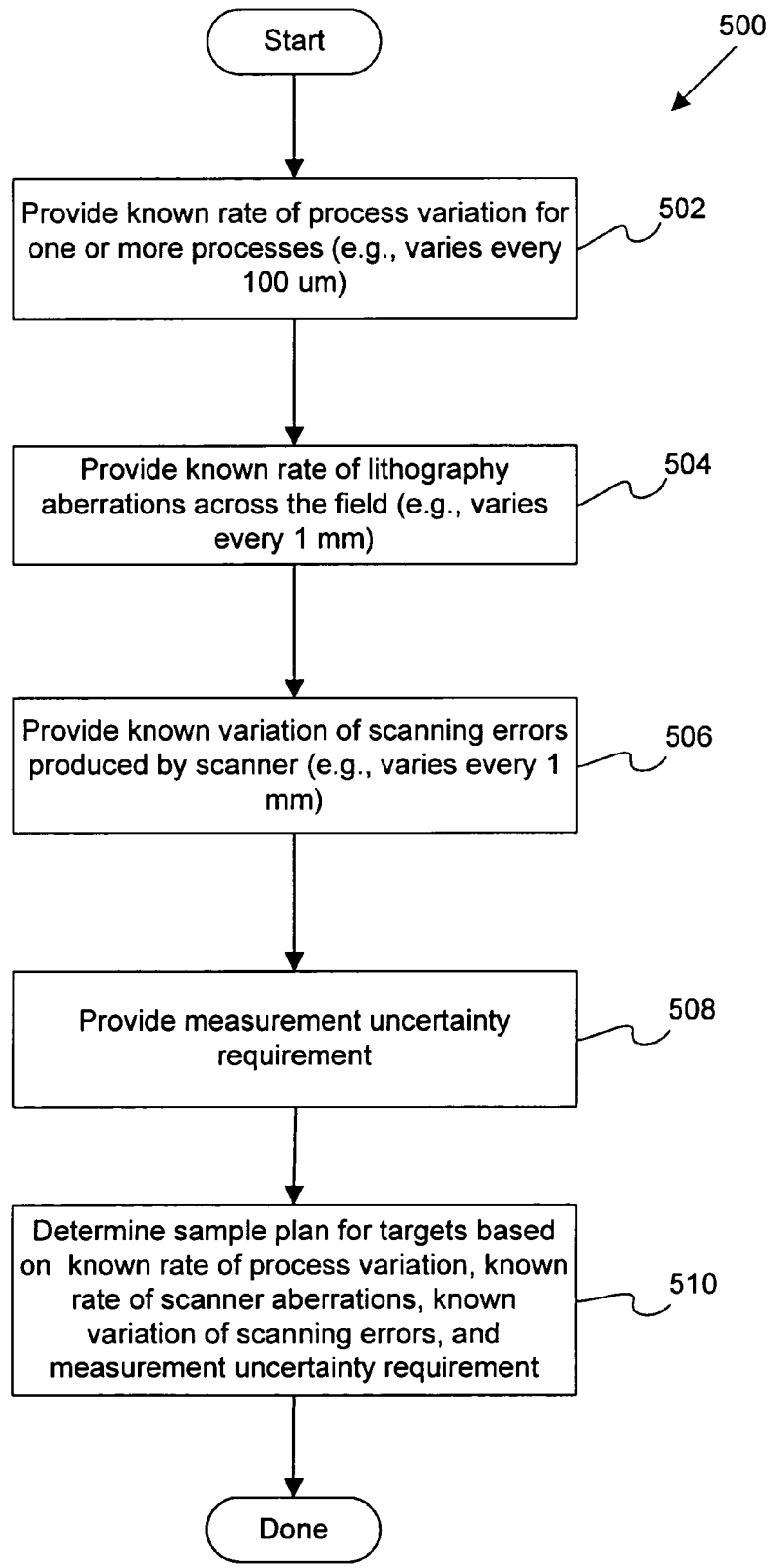
FIG. 5 is a flowchart illustrating a procedure for determining a sample plan in accordance with one embodiment of the present invention.

The sample plan may be based on any suitable type and number of known process variations. FIG. 5 is a flowchart illustrating a procedure 500 for determining a sample plan in accordance with one embodiment of the present invention. Initially, a known rate of process variation is provided for one or more processes in operation 502. For instance, the known rate of CMP (chemical mechanical polishing) may be quantified with a variation every 100 μm. A known rate of aberrations across the field of a stepper or scanner type lithography tool is also provided in operation 504. For example, the aberrations may vary every 1 mm. In the case of a scanner type tool, aberrations may also be known to vary across the exposure slit. For instance, pattern placement error may vary across a length of a rectangular shaped slit due to variations in optics aberrations across the slit. Additionally, errors due to synchronization problems between movement of the scanner stage and movement of the slit may vary along the scan direction, that is orthogonal to the slit. A known variation of lithography errors produced by a lithography tool is also provided in operation 506. For instance, the scanning errors may be known to vary every 1 mm. A measurement uncertainty requirement (or mark fidelity) is also provided in operation 508.

A sample plan is then determined for the targets based on the provided known rate of process variation, known rate of lithography aberrations, known variation of scanning errors, a known rate of reticle write errors, and measurement uncertainty requirement in operation 510. For example, a minimum placement distance between targets may be selected as the minimum variation spacing of the process variations, lithography aberrations, and lithography errors. In the above examples of variations of 100 μm, 1 mm, and 1 mm, the spacing may be selected to be 100 μm. A spacing may be selected for both an x direction and a y direction (e.g., to accommodate variations both along the direction of the slit and direction of the scan). A suitable number of targets may be selected to result in a measurement uncertainty equal to or less than the required measurement uncertainty.

Any suitable technique may be used to obtain known process or lithography error variations for a sample plan of a particular target type. For example, the lithography aberration variation across the field are usually provided with the lithography tool. One may use test reticles and quantify the variation in scanning errors across the reticle. Likewise, a number of test wafers may be fabricated to quantify the variation in process errors across the wafer or field. The measurement uncertainty requirement may be obtained by independently estimating the uncertainty contributions, such as precision, tool induced shift and mark fidelity.

The techniques of the present invention may also be practiced on reticles, as well as semiconductor devices. That is, targets may be written within the active regions of one or more reticles using a reticle writer tool. These targets may then be inspected or measured on the resulting reticles. When targets are to be placed within an active regions of a reticle, a known rate of reticle write errors may also be considered as a target placement parameter. More generally, an additional consideration regarding the density of placement of the metrology or inspection targets may include the performance characteristics of the reticle write process. By way of examples, the characteristic sub-field size of the reticle write tool or the nature of the registration errors (e.g., due to sequence of the reticle patterning) may be considered during target placement.

Each target type may have a particular size, shape, and orientation which depends on the particular inspection, review, or metrology to be performed on such target. Any suitable number and type of targets may be integrated within a die layout pattern. The targets may include one or more of the following types: overlay, CD, film thickness, lithography focus or exposure, CMP polish uniformity or formed dishing and erosion, etc.

By way of example, rules may be developed for an overlay type target based on the types of measurements made on such a target type. Overlay type targets are used to measure misalignment between two different layers. Of course, misalignment may be measured between more than two layers, e.g., all the layers of the device. In a two layer example, each overlay target is formed from a first layer structure and a second subsequent layer structure. Additionally, the structures on the different layers of an overlay target would be designed to have a same center of symmetry. Thus, in a two layer target, the first layer target structures would have a same center of symmetry as the second layer target structures. Additionally, the target portions in the two different layers are preferably proximate to each other so that they may be measured together, e.g., within a single field. Although not required, the two different layer structures of each overlay target are preferably not on top of each other. In one implementation, the first layer structures are at a different rotational position with respect to the center of symmetry than the second layer structures. In another embodiment, the targets may be over the top of one another for Moiré or scatterometry measurements.

Figure 6A:
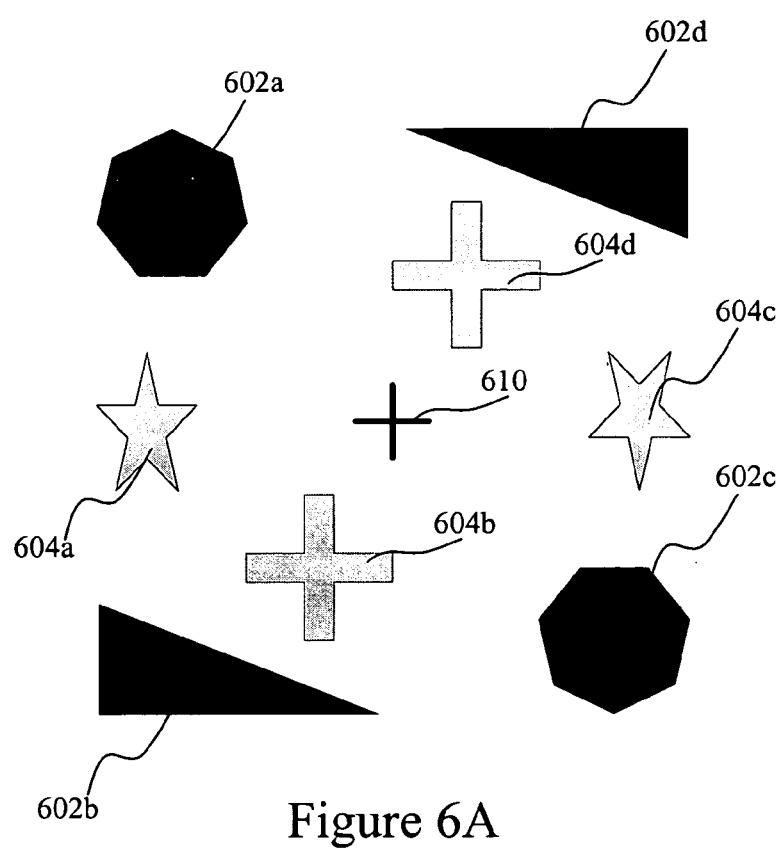
FIG. 6A is a diagrammatic top view of an overlay target in accordance with a specific implementation of the present invention.

FIG. 6A is a diagrammatic top view of an overlay target in accordance with a specific implementation of the present invention. Each set of target structures in each layer may include any number and shape of structures. Additionally, each set of structures for each layer have a same center of symmetry 610. A first set of structures in a first layer (shaded black) includes structure 602*a* through 602*d* which have a center of symmetry 610. Structures 602*a* and 602*c* are 7 sided polygons, while structures 602*b* and 602*d* are triangles. A second set of structures in a second layer (shaded gray) includes structure 604*a* through 604*d* which have the same center of symmetry 610 as the first set of structures in the first layer. Structures 604*a* and 604*c* are star shaped polygons, while structures 604*b* and 604*d* are cross shaped polygons.

Figure 6B:
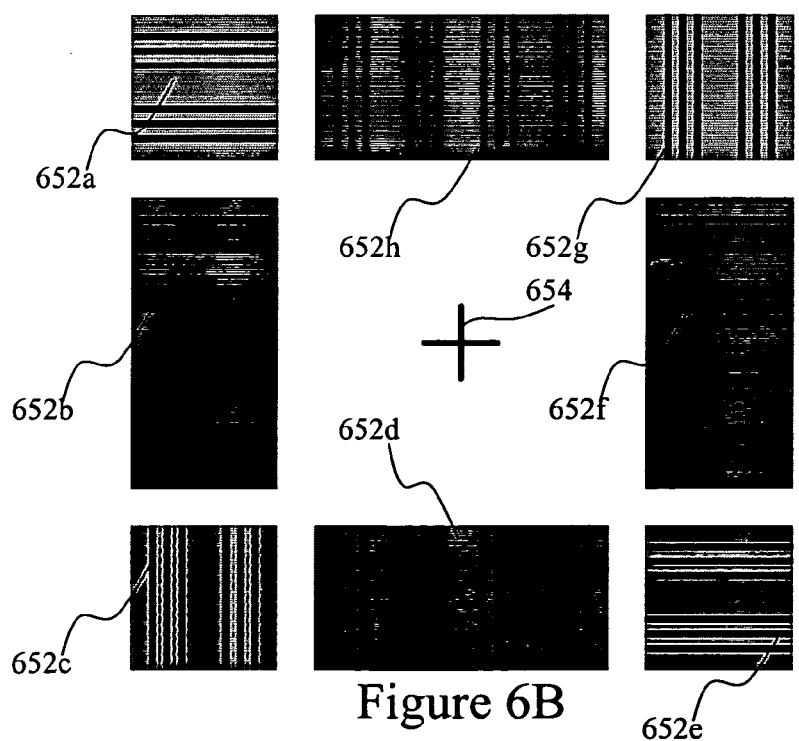
FIG. 6B is a diagrammatic top view of an overlay target in accordance with an alternative implementation of the present invention.

FIG. 6B is a diagrammatic top view of an overlay target in accordance with an alternative implementation of the present invention. In this embodiment, each structure includes a plurality of horizontal or vertical lines in two different layers. A first layer is shaded black, while a second layer is shaded gray. Each horizontal and vertical line may also be formed from a plurality of segments (not shown). As shown, horizontal structures 652a, 652b, 652e and 652f and vertical structures 652b, 652c, 652d, 652g, and 652h have a same center of symmetry 654.

The target rules preferably include a requirement that the target be placed in a layer which is measurable or inspectable by a particular type of tool. For example, the target may have to be on a top layer or be covered with only optically transparent layers so that the target may be inspected by an optical tool. In other applications, the target may be required to be underneath an opaque layer so that the opaque layer's conformance to the underlying target may be inspected and/or measured. Additionally, each inspection, review, or metrology tool typically has a size constraint as to the measured or inspected structure. That is, structures below a particular size cannot be seen. Therefore, the targets must be sized so that they can be measured or inspected by the relevant tool.

Additionally, the die layout may be analyzed to determine whether particular portions or areas have a characteristic which negatively or positively affects metrology or inspection results, as compared with other areas of the die layout. For example, particular layout characteristics may result in more reliable or accurate metrology or inspection results. In one specific case, targets may be placed in areas which have characteristics that positively affect the metrology or inspection. In an example of such a feature characteristic, a chemical mechanical polishing (CMP) procedure is typically tuned to achieve superior accuracy with a particular feature density range. Thus, targets, such as overlay targets, may be placed in layout regions which are within the particular feature density range for an optimal CMP process.

The circuit designer may be aware of feature locations in the die layout which are most susceptible to error or defects. The designer may communicate the position of such features to the target placement software or layout engineer so that targets may be placed proximate to such problem features. This placement technique would likely result in a higher incidence of defect capture and more reliable resulting products.

As mentioned, the targets may also be placed within a dummy layer. It is common practice in semiconductor manufacturing today to include dummy structures in open areas of the circuit layout to ensure uniform pattern density. Dummy structures are generally used for optimal results in chemical mechanical polishing and other semiconductor manufacturing processes.

In order to enable targets inside the chip area, there are significant advantages in combining the functionality of the particular metrology (or inspection) target with the purpose of the dummy structures. That is, a structure which has two components that serve both purposes of a dummy structure and a metrology (or inspection) target would efficiently utilize the open spaces of the die area to increase CMP uniformity (and other dummy requirements where applicable), as well as to provide a metrology or inspection target. Additionally, a new type of metrology or inspection may be used with such combination marks. For example, a particular design pattern's fidelity may be monitored via such combination target. That is, a designer's intent regarding a particular pattern's function or structure may be verified with respect to the pattern being combined and measured or inspected in a dummy structure.

A combination target and dummy structure can be achieved in a number of different ways. In one example of a combination dummy and overlay structure, the structures can be designed on two masks such that they form interlaced periodic structures. Any suitable types of overlay structures may be used. Suitable overlay targets and techniques for determining overlay with same are described in the following U.S. patents and applications: (1) U.S. Pat. No. 6,462,818, issued 8 Oct. 2002, entitled "OVERLAY ALIGNMENT MARK DESIGN", by Bareket, (2) U.S. Pat. No. 6,023,338, issued 8 Feb. 2000, entitled "OVERLAY ALIGNMENT MEASUREMENT OF WAFER", by Bareket, (3) application Ser. No. 09/894,987, filed 27 Jun. 2001, entitled "OVERLAY MARKS, METHODS OF OVERLAY MARK DESIGN AND METHODS OF OVERLAY MEASUREMENTS", by Ghinovker et al., (4) U.S. Pat. No. 6,486,954, issued 26 Nov. 2002, entitled "OVERLAY ALIGNMENT MEASUREMENT MARK" by Levy et al., (5) application Ser. No. 10/367,124, filed 13 Feb. 2004 by Mike Adel et al, and (6) application Ser. No. 10/785,396 filed 23 Feb. 2004 by Walter D. Mieher, et al. These patents and applications are all incorporated herein by reference in their entirety.

An overlay type combination and dummy structure includes two components one on a first layer or mask and one on a second layer or mask. Each component preferably complies with the requirements for a dummy structure of the process step associated with that layer or mask. A further example may be a case where these periodic structures are aligned such that the component on a first mask is symmetrically positioned with respect to the component on a second mask when the masks are correctly aligned. Also, the component on a first mask may be designed to fit into the open spaces within the component on a second mask and visa versa. As a further particular example, the periodic component on the two masks could be identical but offset by half a unit cell of the periodic structure along both x and y axes. Alternatively the component on a first mask may have a different structure than the component on a second mask but is still offset by half a unit cell of the component as above. Example overlay type combination targets are shown in FIGS. 6C through 6E.

Each component may also contain an additional coarse segmentation which is periodic and is designed to improve the contrast and information content for the metrology tool as further described in the above referenced U.S. application Ser. No. 10/367,124 by Mike Adel et al.

Figure 6C:
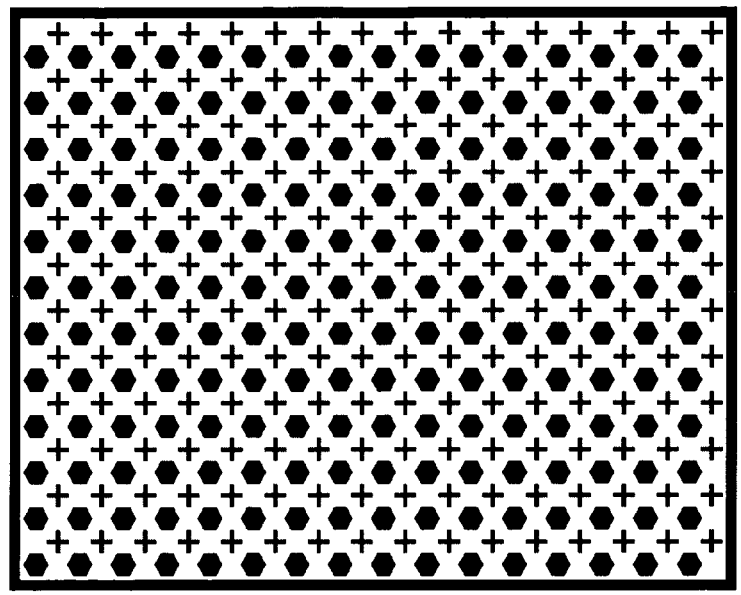
FIGS. 6C through 6E together illustrate a technique for forming combination dummy and overlay structures, as well as example structures, in accordance with specific implementations of the present invention.
Figure 6D:
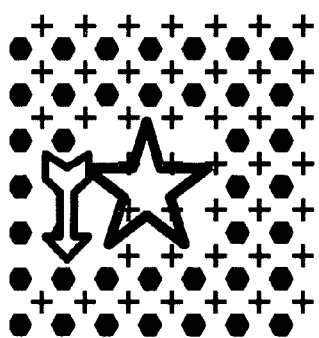
Figure 6E:
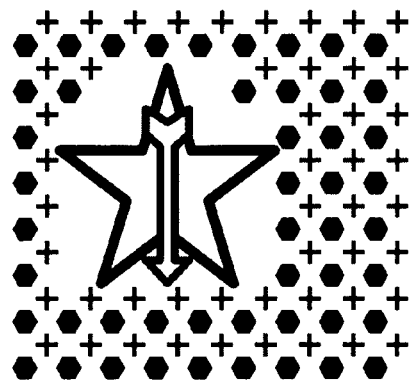

FIGS. 6C through 6E together illustrate a technique for forming combination dummy and overlay structures, as well as example structures, in accordance with specific implementations of the present invention. An open space may be filled with any suitably sized and shaped combination dummy and target structures (referred to herein as targets). As shown in FIG. 6C, an array of targets are formed within an open area. The targets include a first set of structures on a first layer (e.g., the "+" shaped structures) and a second set of structures on a second layer (e.g., the hexagon shaped structures).

In another technique, an array of targets may be conceptually used to fill in around actual device structures. As shown in FIG. 6D, an array of hexagon shaped and "+" shaped structures are overlaid onto two device structures. For illustration purposes, one device structure is shaped like a star and is on a same layer as the hexagon target structures, while another device structure is shaped like an arrow and is on the same layer as the "+" shaped target structures. After the target array is overlaid with the device structures, some of the target structures are removed to accommodate the device structures. That is, target structures on one layer are removed from an area encompassing the device structure on the same layer. As shown, the "+" shaped structures are removed from an area encompassing the arrow shaped device structure, and the hexagon shaped structures are removed from an area encompassing the star shaped device structure. If the device structures on two different layers are overlapping, however, both layers of targets are removed from an area encompassing the two overlapping device structures as illustrated in FIG. 6E.

In these combination dummy and target examples, a signal is detected from the field of views (FOV's) as represented in FIGS. 6C-6E. When the target structures fill up the entire FOV, the center of symmetries of the first and second layers are determined. The center of symmetries are designed to be located at the same position or the same relative position so that a discrepancy can be translated into an overlay value. When the FOV includes both targets and devices as in FIGS. 6D and 6E, it is first determined which parts of the signal are noise (or device structures) and which parts correspond to the target structures. This determination may be determined in suitable manner. In one embodiment, the signal (or image generated from such signal) is compared to a design file which identifies device structures and the device structures' contribution to the signal (or image) is subtracted from the signal (or image). The resulting signal (or image) corresponds to the target which may then be assessed as previously described. Alternatively, one may manually train the metrology tool to locate targets by manually moving the tool to known target locations and identifying the targets. These identified targets can then be used by the metrology tool to search for other targets with a similar appearance using standard pattern recognition techniques. Alternatively, a representative target in the design file may be used to train the metrology tool. The representative target may also be located in a easily found position, such as the scribe line.

In general, rules for both dummy structures and the particular target type are followed when forming combination dummy and target structures. For instance, the dummy structure rules may require a particular pattern density or maximum open space size for ensuring a particular level of CMP uniformity. Additionally, the particular metrology or inspection procedure rules for the targets are followed. In one type of overlay metrology technique, the structures on two different layers are assessed to determine whether their centers of symmetry are where they should be (e.g., aligned) to thereby determine overlay. In this example, the structures are designed on two different layers and have a same center of symmetry or known relative centers of symmetry.

Other types of overlay metrology, such as scatterometry overlay determination, may require periodic structures which are designed to be aligned or designed with a predetermined offset since overlay is determined by assessing the phase relationship between the two layer structures. Several scatterometry overlay techniques are further described in the above referenced U.S. application Ser. No. 10/785,396 and several phase techniques are described further in U.S. Pat. No. 6,462,818, Issued 8 Oct. 2002 by Bareket and U.S. Pat. No. 6,023,338, issued 8 Feb. 2000 by Bareket, which patents are incorporated herein by reference in their entirety. For a CDSEM type measurement, the target structures are designed to replicate device features.

When an array of combination dummy and target structures is used (e.g., FIGS. 6C-6E), the metrology procedure may be streamlined by eliminating target acquisition and/or centering operations. For example, when conventional targets, such as a box-in-box overlay target, are measured, the metrology tool is initially trained by manually locating and then centering an initial target in the tool's FOV. The metrology tool then automatically moves to predefined target locations which are at predefined locations relative to the initial target. Each found target is also centered prior to measuring overlay.

In a preferred embodiment, a list of target coordinates may be given to the metrology tool. The metrology tool then steps to each target coordinate. Since the targets are distributed across the FOV and the center is not defined, the tool does not have to center the targets in the FOV. Elimination of the target acquisition and centering operations significantly improves the efficiency of the metrology procedure. Furthermore, it eliminates the need for operator intervention at this step of the train procedure, enabling a greater level of automation in the process of metrology and inspection recipe generation.

Figure 7:
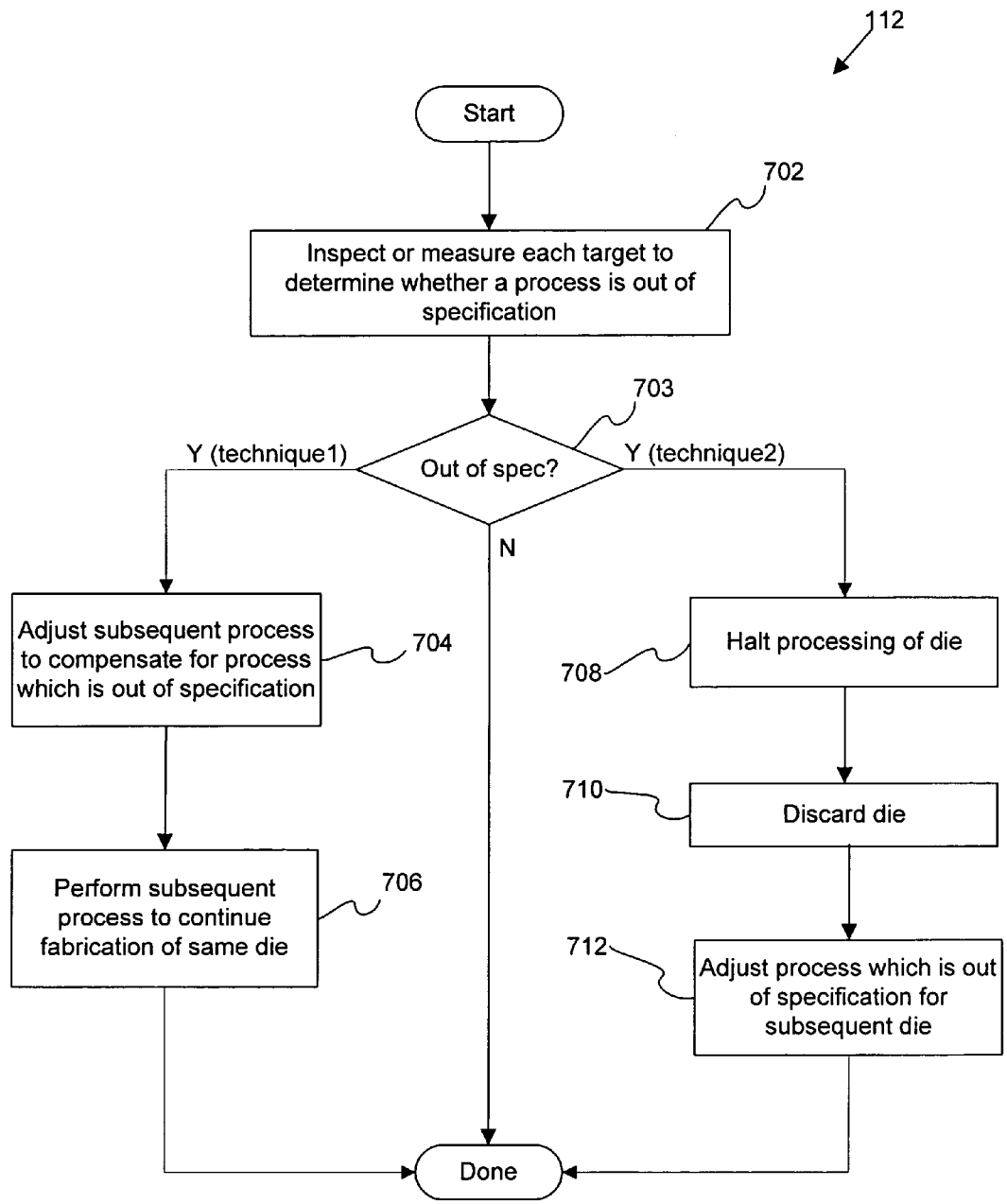
FIG. 7 is a flowchart illustrating the operation of FIG. 1 for inspecting targets fabricated from a layout pattern generated in accordance with techniques of the present invention.

After a die and targets are fabricated using a layer pattern having integrated active regions and targets, the targets may be inspected, reviewed, or measured in any suitable manner. FIG. 7 is a flowchart illustrating the operation 112 of FIG. 1 for inspecting targets fabricated from a layout pattern generated in accordance with techniques of the present invention. Initially, each target is inspected or measured to determine whether a process is out of specification in operation 702. It is then determined whether a process is out of specification in operation 703. If a process is not out of specification, the inspection, review, or measurement procedure ends.

If a process is out of specification, a number of techniques may be implemented to alleviate the problem. In a first technique, a subsequent process may be adjusted to compensate for the process which is out of specification in operation 704. For example, if it is determined that the photoresist pattern is misaligned in any portion, the photoresist may then be stripped and reapplied in a corrected pattern to eliminate the misalignment. The subsequent process is then performed so as to continue fabrication of the same die in operation 706. For example, the wafer may be patterned. In a second technique, processing of the die may be halted in operation 708. The die may then be discarded in operation 710. The process which is out of specification may then be adjusted for subsequent die(s) in operation 712.

A target may be inspected, reviewed, or measured using conventional techniques. In an inspection example, an ideal baseline image of the target may be generated or "rendered" from the corresponding target layout pattern. The baseline image may be generated in any suitable manner, such as by merely directly converting the contents of the target layout pattern into an image. Alternatively, the target layout pattern may be rendered by simulating fabrication results from making a target that perfectly matches the target layout pattern. For example, the corners of a target pattern in the baseline image may be rounded to account for corner rounding that commonly occurs during fabrication of a target. The baseline image may also include simulated optical effects from retrieving an optical image of the simulated target. Such optical effects are necessarily encountered when an optical inspection technique is used to evaluate a target. Additionally, a vendor may provide the end user of the target, e.g. a fabrication facility, with the baseline image of the target and perform the above described steps of baseline generation. Alternatively, the baseline image may be generated from a target in an adjacent die in a die-to-die inspection approach. In this approach, the images of two supposedly identical targets are generated, one for a baseline image and one for a test image.

After the baseline image has been provided, the target is inspected to obtain a test image of the target. Any suitable mechanism may be implemented for obtaining the test image. For example, an optical or ebeam image be obtained. The test image is then compared to the baseline image. If a difference between the baseline and test images is greater than a predetermined threshold, it is determined that a defect exists. The defect may then be classified by comparing it to known defect types to determine a root cause of the defect. The root cause may include one or more out of specification process(es).

A further method of target layout placement could be with respect to modification of dummy structures to comply with specific metrology/inspection target design requirements. By way of example, if overlay was to be measured by scatterometry, then a layout rule could be implemented which requires that periodic dummy structures be placed above one another on subsequent layers. Furthermore, these dummy structures could be designed with specific offsets between them as disclosed in U.S. Applications: (1) application Ser. No. 10/729,838 filed 5 Dec. 2003 by Walter D. Mieher et al. and (2) application Ser. No. 10/785,396 filed 23 Feb. 2004 by Walter D. Mieher et al., which applications are herein incorporated by reference in their entirety. For example, adjacent areas could be designed to have equal but opposite offsets relative to the dummy structures on the underlying layer. Many other offset configurations could be implemented.

The techniques of the present invention may be implemented in any suitable combination of software and/or hardware system. Regardless of the system's configuration, it may employ one or more memories or memory modules configured to store data, program instructions for the general-purpose inspection operations and/or the inventive techniques described herein. The program instructions may control the operation of an operating system and/or one or more applications, for example. The memory or memories may also be configured to store layout patterns, layout constraint rules and target rules.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of generating a semiconductor layout pattern that is representative of a semiconductor die and a plurality of target structures, the method comprising:
   providing a layout pattern that is representative of a semiconductor die and that can be used to fabricate such semiconductor die; and
   integrating a plurality of layout patterns that are representative of a plurality of target structures into the layout pattern of the die so that the target layout patterns are integrated within the die, the target layout patterns being usable to fabricate the target structures,
   wherein the die layout pattern conforms to a set of layout constraint rules and the target layout patterns are integrated so as to conform to such layout constraint rules,
   wherein each target layout pattern has a particular type which must conform to a set of target rules to facilitate inspection or measurement of each fabricated target structure and the target layout patterns are integrated so as to conform to such target rules.

2. A method as recited in claim 1, wherein the semiconductor die is a product device.

3. A method as recited in claim 1, wherein the die layout pattern includes routing paths between features located within the die layout pattern and the target layout patterns are each integrated into the die layout pattern at locations where there is an absence of the routing paths.

4. A method as recited in claim 1, wherein the target rules for each target type include a maximum spacing between each target layout pattern and a minimum spacing between each target layout pattern, wherein each target layout pattern is integrated so that it is at least the minimum spacing for its type to a next one of the target layout patterns having the same type, and wherein each target layout pattern is integrated so that it is no more than the maximum spacing for its type from a next one of the target layout patterns having the same target type.

5. A method as recited in claim 4, wherein the minimum spacing corresponds to a known process variation for fabricating the die using a particular process.

6. A method as recited in claim 1, wherein at least one of the target types is an overlay type and the target rules for each target layout pattern having the overlay type require that such overlay type target layout pattern be integrated within a first layer and a second subsequent layer so as to have a same center of symmetry.

7. A method as recited in claim 1, wherein the layout constraint rules include feature size constraints and feature pitch requirements, wherein the target layout patterns are integrated so as to conform to the feature size constraints and the feature pitch constraints.

8. A method as recited in claim 1, wherein the layout constraint rules include a spacing size and aspect ratio constraint based on each available space within the die pattern, the method further comprising sizing each target layout pattern to conform to at least one of the available space's size and aspect ratio constraint for integration of such each target in such available space.

9. A method as recited in claim 1, wherein the target layout patterns are selected from a library of standard target layout patterns which conform to any combination or portion of the layout constraint rules and the target rules.

10. A method as recited in claim 1, further comprising storing a location and identity of each target layout pattern as location data.

11. A method as recited in claim 10, further comprising transferring the location data to a metrology or inspection tool.

12. A method as recited in claim 10, wherein the location data is stored within a fabrication database which is accessible by a plurality of processing tools for fabricating the die and target structures from the die and target layout patterns.

13. A method as recited in claim 12, wherein the fabrication database is also accessible by a plurality of metrology tools for measuring the target structures and/or a plurality of inspection tools for inspecting the target structures.

14. A method as recited in claim 10, wherein the location data is stored in a format which allows a metrology or inspection tool to access the stored location data.

15. A method as recited in claim 14, wherein the format is OpenAccess format.

16. A method as recited in claim 1, wherein the target layout patterns are integrated automatically by a design tool configured to comply with the layout constraint rules and the target rules.

17. A method as recited in claim 1, wherein the target rules include requirements for placing each target layout pattern on a layer within a layer stack which allows measurement or inspection of the each target structure.

18. A method as recited in claim 17, wherein target rules include a requirement that the layer of the each target layout pattern is on a top layer or is underneath a transparent layer.

19. A method as recited in claim 17, wherein target rules include a requirement that the layer of the each target layout pattern is underneath an opaque layer.

20. A method as recited in claim 1, wherein the target rules include placing the target layout patterns so that they conform to a predetermined sample plan.

21. A method as recited in claim 20, wherein the sample plan is based on one or more of the following: a known rate of process variation, a known rate of lithography aberration, a known rate of scanning errors, a known rate of reticle write errors, and a measurement uncertainty requirement.

22. A method as recited in claim 21, wherein the known rate of lithography aberration includes both a known x and y direction aberration across a slit of the lithography tool having the lithography aberration.

23. A method as recited in claim 1, wherein the target layout patterns are integrated within a special layer which is excluded from the die layout pattern.

24. A method as recited in claim 1, wherein the target structures are selected from a group comprising an overlay target structure, a critical dimension (CD) target structure, a film thickness target structure, a lithography focus or exposure structure, and a chemical mechanical polishing (CMP) uniformity or formed dishing and erosion structure.

25. A method as recited in claim 1, wherein the die layout pattern includes at least one specific area having a characteristic which positively affects metrology or inspection results and wherein at least one of the target layout patterns is placed into the at least one specific area of the die layout portion.

26. A computer program product for generating a semiconductor layout pattern that is representative of a semiconductor die and a plurality of target structures, the computer program product comprising:

at least one computer readable medium;

computer program instructions stored within the at least one computer readable product configured for:

providing a layout pattern that is representative of a semiconductor die and that can be used to fabricate such semiconductor die; and integrating a plurality of layout patterns that are representative of a plurality of target structures into the layout pattern of the die so that the target layout patterns are integrated within the die, the target layout patterns being usable to fabricate the target structures, wherein the die layout pattern conforms to a set of layout constraint rules and the target layout patterns are integrated so as to conform to such layout constraint rules, wherein each target layout pattern has a particular type which must conform to a set of target rules to facilitate inspection or measurement of each fabricated target structure and the target layout patterns are integrated so as to conform to such target rules.

27. A computer program product as recited in claim 26, wherein the die layout pattern includes routing paths between features located within the die layout pattern and the target layout patterns are each integrated into the die layout pattern at locations where there is an absence of the routing paths.

28. A computer program product as recited in claim 26, wherein the target rules for each target type include a maximum spacing between each target layout pattern and a minimum spacing between each target layout pattern, wherein each target layout pattern is integrated so that it is at least the minimum spacing for its type to a next one of the target layout patterns having the same type, and wherein each target layout pattern is integrated so that it is no more than the maximum spacing for its type from a next one of the target layout patterns having the same target type.

29. A computer program product as recited in claim 28, wherein the minimum spacing corresponds to a known process variation for fabricating the die using a particular process.

30. A computer program product as recited in claim 26, wherein at least one of the target types is an overlay type and the target rules for each target layout pattern having the overlay type require that such overlay type target layout pattern be integrated within a first layer and a second subsequent layer so as to have a same center of symmetry.

31. A computer program product as recited in claim 26, wherein the layout constraint rules include feature size constraints and feature pitch requirements, wherein the target layout patterns are integrated so as to conform to the feature size constraints and the feature pitch constraints.

32. A computer program product as recited in claim 26, wherein the target layout patterns are selected from a library of standard target layout patterns which conform to any combination or portion of the layout constraint rules and the target rules.

33. A computer program product as recited in claim 26, further comprising storing a location and identity of each target layout pattern as location data.

34. A computer program product as recited in claim 33, further comprising providing the location data to a metrology or inspection tool.

35. A computer program product as recited in claim 26, wherein the target layout patterns are integrated automatically by a design tool configured to comply with the layout constraint rules and the target rules.

36. A computer program product as recited in claim 26, wherein the target rules include placing the target layout patterns so that they conform to a predetermined sample plan.

37. A computer program product as recited in claim 26, wherein the target layout patterns are integrated within a dummy layer.

38. A computer program product as recited in claim 26, wherein the target layout patterns are integrated within a special layer which is excluded from the die layout pattern.

39. A computer program product as recited in claim 26, wherein the target structures are selected from a group comprising an overlay target structure, a critical dimension (CD) target structure, a film thickness target structure, a lithography focus or exposure structure, and a chemical mechanical polishing (CMP) uniformity or formed dishing and erosion structure.

40. A computer system operable to generate a semiconductor layout pattern that is representative of a semiconductor die and a plurality of target structures, the computer system comprising:
one or more processors;
one or more memory, wherein at least one of the processors and memory are adapted for:
providing a layout pattern that is representative of a semiconductor die and that can be used to fabricate such semiconductor die; and
integrating a plurality of layout patterns that are representative of a plurality of target structures into the layout pattern of the die so that the target layout patterns are integrated within the die, the target layout patterns being usable to fabricate the target structures,
wherein the die layout pattern conforms to a set of layout constraint rules and the target layout patterns are integrated so as to conform to such layout constraint rules
wherein each target layout pattern has a particular type which must conform to a set of target rules to facilitate inspection or measurement of each fabricated target structure and the target layout patterns are integrated so as to conform to such target rules.

41. A computer system as recited in claim 40, wherein the die layout pattern includes routing paths between features located within the die layout pattern and the target layout patterns are each integrated into the die layout pattern at locations where there is an absence of the routing paths.

42. A computer system as recited in claim 40, wherein the target rules for each target type include a maximum spacing between each target layout pattern and a minimum spacing between each target layout pattern, wherein each target layout pattern is integrated so that it is at least the minimum spacing for its type to a next one of the target layout patterns having the same type, and wherein each target layout pattern is integrated so that it is no more than the maximum spacing for its type from a next one of the target layout patterns having the same target type.

43. A computer system as recited in claim 42, wherein the minimum spacing corresponds to a known process variation for fabricating the die using a particular process.

44. A computer system as recited in claim 40, wherein at least one of the target types is an overlay type and the target rules for each target layout pattern having the overlay type require that such overlay type target layout pattern be integrated within a first layer and a second subsequent layer so as to have a same center of symmetry.

45. A computer system as recited in claim 40, wherein the layout constraint rules include feature size constraints and feature pitch requirements, wherein the target layout patterns are integrated so as to conform to the feature size constraints and the feature pitch constraints.

46. A computer system as recited in claim 40, wherein the target layout patterns are selected from a library of standard target layout patterns which conform to any combination or portion of the layout constraint rules and the target rules.

47. A computer system as recited in claim 40, further comprising storing a location and identity of each target layout pattern as location data.

48. A computer system as recited in claim 47, further comprising providing the location data to a metrology or inspection tool.

49. A computer system as recited in claim 40, wherein the target layout patterns are integrated automatically by a design tool configured to comply with the layout constraint rules and the target rules.

50. A computer system as recited in claim 40, wherein the target rules include placing the target layout patterns so that they conform to a predetermined sample plan.

51. A computer system as recited in claim 40, wherein the target layout patterns are integrated within a dummy layer.

52. A computer system as recited in claim 40, wherein the target layout patterns are integrated within a special layer which is excluded from the die layout pattern.

53. A computer system as recited in claim 40, wherein the target structures are selected from a group comprising an overlay target structure, a critical dimension (CD) target structure, a film thickness target structure, a lithography focus or exposure structure, and a chemical mechanical polishing (CMP) uniformity or formed dishing and erosion structure.

* * * * *